(12) United States Patent
Koerner

(10) Patent No.: US 9,419,868 B1
(45) Date of Patent: Aug. 16, 2016

(54) VISUALIZATION OF USER BEHAVIOR

(71) Applicant: Amazon Technologies, Inc., Reno, NV (US)

(72) Inventor: Robert James Koerner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 741 days.

(21) Appl. No.: 13/890,712

(22) Filed: May 9, 2013

(51) Int. Cl.
  *G06F 15/173* (2006.01)
  *H04L 12/26* (2006.01)
  *G06F 15/16* (2006.01)

(52) U.S. Cl.
  CPC .................... *H04L 43/045* (2013.01)

(58) Field of Classification Search
  CPC ...................................... H04L 43/045
  USPC .................................. 709/203, 224
  See application file for complete search history.

(56) References Cited

U.S. PATENT DOCUMENTS

2012/0143947 A1* 6/2012 Kikuchi ................. G06Q 30/02
  709/203

FOREIGN PATENT DOCUMENTS

WO  WO 0237368 A2 * 5/2002 ............. G06Q 10/06

\* cited by examiner

*Primary Examiner* — Hee Soo Kim
(74) *Attorney, Agent, or Firm* — Thomas | Horstemeyer, LLP

(57) ABSTRACT

Disclosed are various embodiments for a behavior visualization application. Navigation events are obtained from a client navigating through a workflow. Durations the client is focused on a respective workflow page and the transitions between workflow pages are determined from the navigation events. A visualization embodying the durations of focus and transitions is generated. Visual elements correspond to respective consecutive durations of focus, and are linked to represent transitions between respective workflow pages.

20 Claims, 4 Drawing Sheets

VISUALIZATION OF USER BEHAVIOR

BACKGROUND

A user progressing through a workflow may spend varying amounts of time across multiple workflow pages. The user may also perform varying numbers of transitions between workflow pages. Additionally, the user may also transition away from the workflow. Visualizing the user progression through a workflow provides insight into user behavior patterns and efficiency.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

A user of a workflow service may progress through various subsections of the workflow to accomplish a task. For example, a customer service representative assisting a customer may interact with various network pages in order to provide a solution to the customer. The customer service representative will spend varying amounts of time in each of the network pages, and will perform a varying number of transitions between the network pages. The efficiency of the workflow system or the customer service representative may be indicated by the amount of time spent in the various network pages or in the number of transitions performed.

For example, a customer service representative performing many transitions between network pages may indicate an inefficient workflow design. As another example, a customer service representative performing a greater number of transitions between network pages with respect to other customer service representatives may indicate a deficiency in performance by the particular customer service representative. Additionally, an amount of time spent in a particular network page may indicate whether the respective network page comprises an optimal amount of information, a degree of complexity with respect to tasks performed in that network page, or other data. To this end, visualizing the amount of time spent interacting with particular workflow pages and the transitions performed between those network pages allows for more efficient reviews and analyses of user behavior.

According to various embodiments of the present disclosure, a behavior visualization application aggregates navigation events triggered by a client of a workflow system. These navigation events may include click events for navigation aids, user interface focus events, or other events. The behavior visualization application then determines from these navigation events consecutive amounts of time spent in a respective workflow page, as well as transitions performed between the workflow pages. Additionally, the behavior visualization application may determine amounts of time spent by the client on pages outside of the workflow system and transitions to pages outside the workflow system. The amounts of time and transitions may then be encoded into a visualization.

The visualization generated by the behavior visualization application may comprise visual elements such as geometric shapes with sizes based at least in part on a corresponding amount of time. The visual elements may then be grouped according to a respective one of the workflow pages. The transitions may be encoded as visual links such as lines, arrows, or other figures, which connect the visual elements to indicate a transition from one workflow page to another after an expiration of the time duration encoded by the visual elements.

In the following discussion, a general description of the system and its components is provided, followed by a discussion of the operation of the same.

Figure 1:
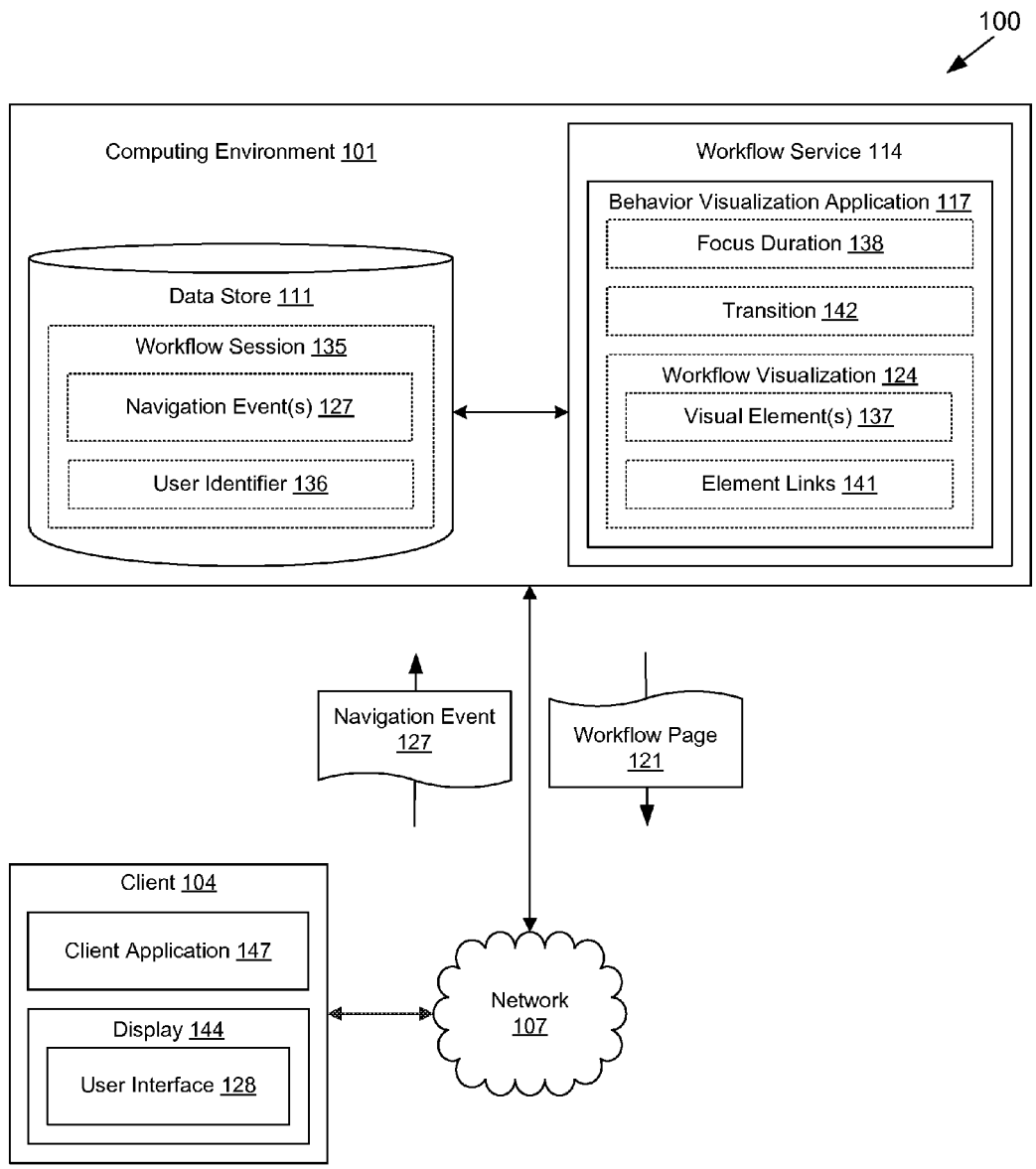
FIG. 1 is a drawing of a networked environment according to various embodiments of the present disclosure.

With reference to FIG. 1, shown is a networked environment 100 according to various embodiments. The networked environment 100 includes a computing environment 101, and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include a workflow service 114 having a behavior visualization application 117, and other applications, services, processes, systems, engines, or functionality not discussed in detail herein.

The workflow service 114 is executed to communicate a plurality of workflow pages 121 to a client 104 to facilitate a user of the client 104 to perform a particular task. The workflow pages 121 comprise data encoded for rendering by the client 104 and navigation aids such as hyperlinks to facilitate a progression of the client 104 through the workflow pages 121. For example, customer service representative a client 104 may access the workflow service 114 to access workflow pages 121 which allow the customer service representative to assist a customer with a particular problem or issue. The workflow pages 121 may then be progressed through by the user via the client 104 using the navigation aids. The progression may be based on sequential steps to be taken with respect to the particular problem or issue, based on information provided by the customer to the customer service representative, or by another approach.

The workflow pages 121 may comprise network pages or other data encoded for rendering by a client 104. For example, the workflow service 114 may comprise functionality to communicate workflow pages 121 to a client 104 via the network 107 responsive to a request conforming to a Hypertext Transfer Protocol (HTTP) or other protocol.

The behavior visualization application 117 is configured to generate a workflow visualization 124 comprising a visual representation of a progression through the workflow pages 121 by a client 104. Although the behavior visualization application 117 is shown as a component of the workflow service 114, it is understood that the behavior visualization application 117 may be executed independent of the workflow service 114. In order to generate the workflow visualization 124, the behavior visualization application 117 may obtain navigation events 127 from a client 104 responsive to interactions performed by the client 104 with respect to the workflow pages 121. Such navigation events 127 may comprise a click event generated responsive to a user of the client 104 clicking or otherwise selecting an element of the workflow page 121 as rendered by the client 104 such as a navigation aid, hyperlink, graphical element, or other element of the workflow page 121.

The navigation events 127 may also be generated by events related to the focus of a user interface 128. The focus of a user interface 128 comprises an element of the user interface which is currently selected to receive input. The navigation events 127 may also comprise a focus event or defocus event associated with a rendering of the workflow page 121. A workflow page 121 becoming the focus of the client 104 may generate a focus event.

A workflow page 121 ceasing to be the focus of the client 104 may generate a defocus event. For example, a focus transitioning between an application rendering the workflow page 121 to a different application would generate a defocus event with respect to the workflow page 121. As another example, navigating from a first workflow page 121 to a second workflow page 121 may generate a defocus event with respect to the first workflow page 121 and a focus event with respect to the second workflow page 121. Navigation events 127 may also comprise other events with respect to a user interface 128 or a rendering of a workflow page 121.

The workflow visualization 124 may comprise a static visualization, such as an image, document, or other format. The workflow visualization 124 may also comprise a dynamic visualization, wherein the rendered content of the workflow visualization 124 changes as a function of user input or other data. For example, the workflow visualization 124 may comprise functionality to zoom in or zoom out, thereby initiating a rendering of the workflow visualization 124 as a function of a new perspective, aspect ratio, or other criteria. The workflow visualization 124 may be encoded to be rendered by a client 104, or rendered by another approach.

The workflow visualization 124 may comprise visual elements 137. The visual elements 137 may comprise a geometric shape or other graphical indicator embodying a focus duration 138. The focus duration 138 comprises a consecutive amount of time that the focus of a client 104 is directed to a respective one of the workflow pages 121. For example, a focus duration 138 may begin upon a user of a client 104 focusing on a tab rendering a first workflow page 121, and end upon the user clicking a navigation aid triggering a rendering of a second workflow page 121. As another example, a focus duration 138 may begin upon a user of a client 104 focusing on a tab rendering a first workflow page 121, and end upon the user of the client 104 ceasing to focus on a workflow page 121.

The focus durations 138 may also encode a chronology of when the consecutive amount of time occurs with respect to other focus durations 138. This allows the focus durations 138 to be grouped or arranged chronologically. The focus durations 138 may also be grouped or arranged by other approaches as can be appreciated. The focus durations 138 may also correspond to other consecutive amounts of time with respect to the focus of the client 104.

The visual elements 137 may have a size, area, dimensions, color, or other graphical factor based at least in part on the length of time embodied in the corresponding focus durations 138. For example, a visual element 137 may comprise a rectangle whose length is generated as a function of the corresponding focus durations 138.

The workflow visualization 124 may also comprise element links 141 graphically linking visual elements 137 corresponding to consecutive focus durations 138. The element links 141 may comprise lines, arrows, or other connections between visual elements 137. To this end, the element links 141 graphically embody transitions 142. Transitions 142 comprise a change in the focus of a client 104 between workflow pages 121 or between a workflow page 121 and a network page distinct from the workflow pages 121. To this end, the transitions 142 associate focus durations 138 which are temporally consecutive with respect to each other. For example, a transition 142 may indicate a change in focus of a client 104 between a first workflow page 121 being focused upon for a first focus duration 138 and a second workflow page 121 being focused upon by the client 104 for a second focus duration 138.

The data stored in the data store 111 includes, for example, workflow sessions 135, and potentially other data. Workflow sessions 135 group a collection of data obtained from the client 104 during a session of the workflow service 114. For example, a workflow session 135 may comprise navigation events 127 obtained from a client 104 to resolve a particular issue, obtained during a consecutive amount of time, or grouped by another approach. The workflow session 135 may comprise a user identifier 136 indicating a user of the client 104 from which the corresponding data was obtained, such as an employee identifier, login username, or other identifier. This may facilitate a later retrieval of the navigation events 127 for generating workflow visualizations 124, or to perform analytics on aggregate workflow sessions 135.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 104 may include a display 144. The display 144 may comprise, for example, one or more devices such as liquid crystal display (LCD)

displays, gas plasma-based flat panel displays, organic light emitting diode (OLED) displays, LCD projectors, or other types of display devices, etc.

The client 104 may be configured to execute various applications such as a client application 147 and/or other applications. The client application 147 may be executed in a client 104, for example, to access network content served up by the computing environment 101 and/or other servers, thereby rendering a user interface 128 on the display 144. To this end, the client application 147 may comprise, for example, a browser, a dedicated application, etc., and the user interface 128 may comprise a network page, an application screen, etc. The client 104 may be configured to execute applications beyond the client application 147 such as, for example, email applications, social networking applications, word processors, spreadsheets, and/or other applications.

Next, a general description of the operation of the various components of the networked environment 100 is provided. To begin, the client 104 initiates a workflow session 135 with the workflow service 114. This may comprise, for example, communicating an event, indicator, or other data to the workflow service 114 to initiate a communication of workflow pages 121 to the client 104. For example, a customer service representative may initiate workflow session 135 upon receiving a call, a chat request, or other communication from a customer. Initiating workflow session 135 would then indicate the customer service representative beginning to offer service to the customer. Workflow sessions 135 may also be initiated by the client 104 by another approach.

After a workflow session 135 has been initiated, the workflow service 114 communicates workflow pages 121 to the client 104. The workflow pages 121 may comprise navigation aids to request additional workflow pages 121, navigational aids linking to network pages external to the workflow pages 121, and potentially other data. In some embodiments, the workflow pages 121 comprise content to facilitate the generation of navigation events 127 by the client 104 during interactions with the workflow pages 121. For example, the workflow pages 121 may comprise embedded content to detect navigation events 127 and communicate the navigation events 127 to the behavior visualization application 117. The embedded content may comprise JavaScript, such as an event listener, or other data. The embedded content may also be included in a template which is applied to the workflow pages 121. Workflow pages 121 may facilitate the generation of navigation events 127 by another approach.

The client 104 then renders the obtained workflow pages 121, thereby rendering a user interface 128. Subsequent browsing activity with respect to the workflow pages 121 then generates navigation events 127 which are communicated to the behavior visualization application 117 via the network 107. For example, a user interface 128 focus of the client 104 directed to a workflow page 121 may generate a focus navigation event 127 with respect to the workflow page 121. As another example, clicking a navigation aid embedded in a first workflow page 121 linking to a second workflow page 121 may generate a click navigation event 127 and a defocus navigation event 127 with respect to the first workflow page 121 and a focus navigation event 127 with respect to the second workflow page 121.

The client 104 may also generate navigation events 127 by changing the focus of a client 104 rendering a user interface 128 of a tabbed browser client application 147 by switching between various tabs. For example, switching between a tab rendering a first workflow page 121 and a tab rendering content other than a workflow page 121 may generate a defocus navigation event 127, and generate a focus navigation event 127 after switching back to the tab rendering the workflow page 121. Navigation events 127 may also be generated by the client 104 for communication to the behavior visualization application 117 by other browsing activities as can be appreciated.

During the workflow session 135, the behavior visualization application 117 may also obtain other data from the client 104 associated with the progression through the workflow pages 121. Such data may include screen shots, screen capture video, or other visual data. Such data may also include audio samples, such as a phone conversation recording, voice chat or voice-over-internet-protocol (VOIP) recording, or other audio data. The behavior visualization application 117 may also capture keystroke logs or other data indicative of client 104 interactions during a workflow session 135.

The client 104 will then end the workflow session 135 with the workflow service 114. This may comprise communicating an event or input indicating the workflow session 135 should end. For example, a customer service representative may end a workflow session 135 upon resolving a customer issue or upon terminating communications with the customer. This may also comprise an expiration of a predefined period of inactivity with respect to the workflow service 114 and the client 104. The workflow session 135 may also be ended by the client 104 by another approach. Responsive to the workflow session 135 ending, the behavior visualization application 117 may store the navigation events 127 as a workflow session 135 in the data store 111. This allows for workflow visualizations 124 to be generated after a workflow session 135 has ended by loading the workflow session 135 from the data store 111.

The behavior visualization application 117 then generates a workflow visualization 124. The workflow visualization 124 may be generated with respect to a completed workflow session 135. The workflow visualization 124 may also be generated during a workflow session 135, contemporaneous to obtaining navigation events 127, or by another approach. The workflow visualization 124 may be generated at a predefined interval, responsive to a workflow session 135 being terminated, responsive to a request or other input, or responsive to other criteria. Generating the workflow visualization 124 may comprise, for example, calculating focus durations 138 as a function of the navigation events 127.

Focus durations 138 indicate a consecutive amount of time that a focus of a client 104 is directed to a respective one of the workflow pages 121. Focus durations 138 may also indicate a consecutive amount of time that a focus of a client is directed away from a workflow page 121, such as browsing a network page communicated by a source other than the workflow service 114. To this end, workflow pages 121 may be associated with multiple focus durations 138, indicating multiple distinct interactions with a workflow page 121. Generating focus durations 138 may comprise calculating an amount of time between two consecutive navigation events 127. For example, the amount of time between a first focus navigation event 127 for a first workflow page 121 and a defocus navigation event for the first workflow page 121 or a second focus navigation event 127 for a second workflow page 121 may generate a focus duration 138 associated with the first workflow page 121.

This may also comprise generating transitions 142 embodying a change in the focus of a client 104 between workflow pages 121 or between a workflow page 121 and content distinct from the workflow pages 121. Transitions 142 may be generated as a function of the navigation events 127. For example, a first navigation event 127 may indicate a focus of a client 104 being directed towards a first workflow page 121. A second navigation event 127 may indicate a change in the focus of the client to being directed towards a second workflow page 121. A transition 142 indicating a change in the focus of the client 104 from the first workflow page 121 and the second workflow page 121 may be then be generated from the first and second navigation events 127.

As another example, a first navigation event 127 may indicate a focus of a client 104 being directed towards a first workflow page 121. A second navigation event 127 may indicate a click of a link within the first workflow page 121. With no subsequent navigation event 127 indicating a focus on a second workflow page 121, a transition 142 indicating a change in the focus of the client 104 from the first workflow page 121 away from the workflow pages 121 may be then be generated from the first and second navigation events 127.

After generating the focus durations 138 and the transitions 142, the behavior visualization application 117 may then encode the focus durations 138 and transitions 142 into a workflow visualization 124. This may comprise, for example, generating visual elements 137 as a function of the focus durations 138. The visual elements 137 may comprise, for example, objects, geometric shapes, or other graphical components having a size, color, area, or dimension generated as a function of a length of time embodied in the corresponding focus duration 138. For example, a visual element 137 may comprise a rectangle having a length proportional to the amount of time embodied in the corresponding focus duration 138.

The visual elements 137 may also be grouped into subsections or other components of the workflow visualization 124 as a function of a workflow page 121 associated with the corresponding focus duration 138. For example, visual elements 137 corresponding to focus durations 138 of a like workflow page 121 may appear in the same line or horizontal orientation with respect to the workflow visualization 124. As another example, visual elements 137 corresponding to focus durations 138 indicating a focus away from workflow pages 121 may appear in the same line or orientation with respect to the workflow visualization 124. Visual elements 137 may also be grouped by another approach.

The visual elements 137 may also be rendered in a left-to-right, right-to-left, or other directed sequence indicating a chronological progression of the corresponding focus durations 138. For example, a visual element 137 may be rendered such that a left-most rendered point is approximate to a right-most rendered point of a visual element 137 having chronologically preceding focus duration 138. The visual elements 137 may also be rendered by another approach.

The visual elements 137 may also facilitate rendering of screen shots, screen captures, or other data obtained by the behavior visualization application 117 during a focus duration 138. For example, the visual elements 137 may render upon a click, hover, or other input event a video or image of the user interface 128 captured during a focus duration 138 corresponding to the visual element 137. The visual elements 137 may also facilitate other functionality.

Generating the workflow visualization 124 may also comprise generating element links 141 graphically connecting visual elements 137 whose corresponding focus durations 138 occur consecutively as embodied in the transitions 142. This may comprise encoding element links 141 as lines or arrows connecting segments of visual elements 137, thereby indicating a transition 142 between the respective consecutive focus durations 138. Element links 141 may also be encoded into the workflow visualization 124 by another approach.

Figure 2:
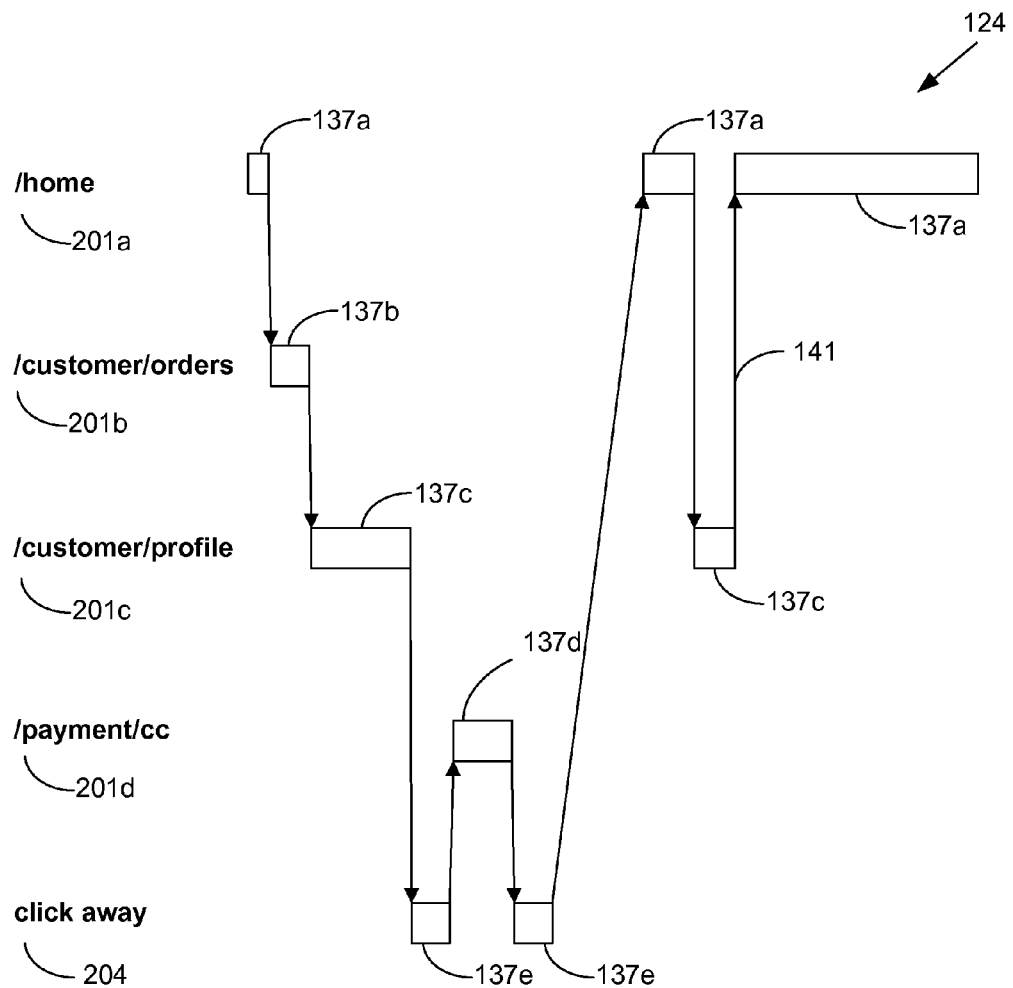
FIG. 2 is a drawing of an example of a workflow visualization generated by a behavior visualization application implemented in the networked environment of FIG. 1 according to various embodiments of the present disclosure.

Turning now to FIG. 2, shown is an example rendering of a workflow visualization 124 according to various embodiments. Items 201a, 201b, 201c, and 201d are text identifiers each corresponding to a respective workflow page 121 (FIG. 1) communicated to a client 104 (FIG. 1) from the workflow service 114 (FIG. 1). To the right of each of the items 201a, 201b, 201c, and 201b are respective visual elements 137a, 137b, 137c, and 137b. Each visual element 137a-d is representative of a focus duration 138 (FIG. 1) indicating a focus of the client 104 being directed towards the workflow page 121 indicated in the respective items 201a-d.

Item 204 is a text identifier indicating that the visual elements 137e to the right of item 204 correspond to focus durations 138 where the focus of the client 104 is directed away from a workflow page 121. The length of each of the visual elements 137a-e is proportional to an amount of time embodied in the corresponding focus duration 138. The element link 141 comprises a line between visual elements 137c and 137a, embodying a transition 142 (FIG. 1) between the focus durations 138 corresponding to the respective linked visual elements 137c and 137a.

Figure 3:
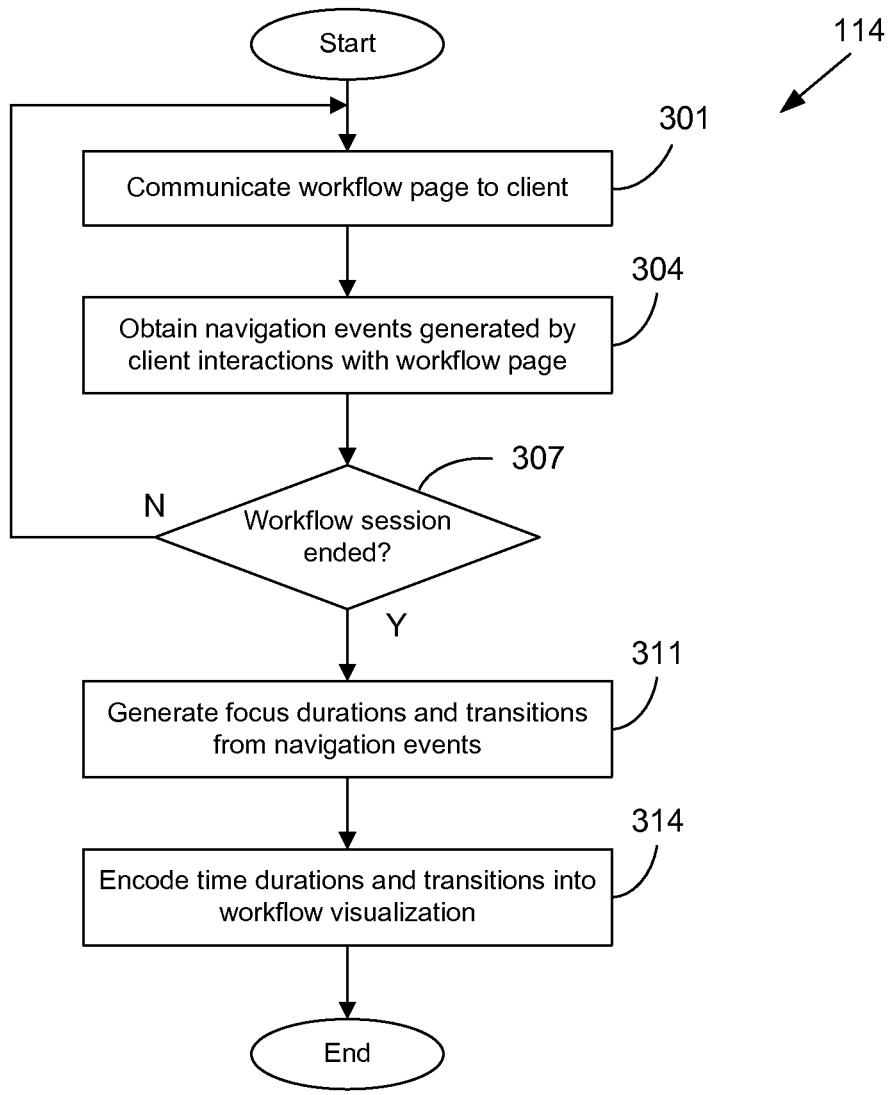
FIG. 3 is a flowchart illustrating one example of functionality implemented as portions of a behavior visualization application executed in a computing environment in the networked environment of FIG. 1 according to various embodiments of the present disclosure.

Moving on to FIG. 3, shown is a flowchart that provides one example of the operation of a portion of the behavior visualization application 117 (FIG. 1) of the workflow service 114 according to various embodiments. It is understood that the flowchart of FIG. 3 provides merely an example of the many different types of functional arrangements that may be employed to implement the operation of the portion of the workflow service 114 as described herein. As an alternative, the flowchart of FIG. 3 may be viewed as depicting an example of steps of a method implemented in the computing environment 101 (FIG. 1) according to one or more embodiments.

Beginning with box 301, the workflow service 114 communicates a workflow page 121 (FIG. 1) to the client 104. The workflow page 121 may be communicated according to a predefined sequence of workflow pages 121, communicated responsive to a request for a workflow page 121 from the client 104, or by another approach. The workflow page 121 may comprise content to facilitate a communication of navigation events 127 (FIG. 1) from the client 104 to the behavior visualization application 117. For example, the workflow page 121 may comprise a template into which event handlers such as a JavaScript event handler has been encoded.

Next, the behavior visualization application 117 of the workflow service 114 obtains navigation events 127 from the client 104. The navigation events 127 may comprise focus events, defocus events, click events, or other input events generated by the client 104 with respect to the workflow page 121. For example, the navigation events 127 may comprise a focus navigation event 127 indicating the focus of a client 104 being directed to a user interface 128 (FIG. 1) rendered by a browser client application 147 (FIG. 1) comprising the workflow page 121. Navigation events 127 may also embody browsing activity indicating a focus of the client 104 being directed away from a workflow page 121, such as a defocus event. Navigation events 127 may also be obtained from the client 104 by another approach.

In box 307, the behavior visualization application 117 determines if a workflow session 135 (FIG. 1) associated with the obtained navigation events 127 has ended. This may comprise determining if a request to end the workflow session 135 has been obtained from the client 104, determining if a predefined period of activity has expired, or determining if some other criteria has been met. If the workflow session 135 has not ended, then boxes 301 and 304 repeat, continuing the process of communicating workflow pages 121 and obtaining navigation events 127.

If the workflow session 135 has ended, then the process proceeds to box 311 where the behavior visualization application 117 generates focus durations 138 (FIG. 1) and transitions 142 (FIG. 1) from the obtained navigation events 127. Generating focus durations 138 may comprise calculating an amount of time between two consecutive navigation events 127. For example, the amount of time between a first focus navigation event 127 for a first workflow page 121 and a defocus navigation event for the first workflow page 121 or a second focus navigation event 127 for a second workflow page 121 may generate a focus duration 138 associated with the first workflow page 121.

Generating transitions 142 may comprise determining a change in the focus of the client 104 from the navigation events 127. For example, a defocus navigation event 127 with respect to a first workflow page 121 and a contemporaneously generated focus event with a second workflow page 121 may generate a transition 142 between the respective workflow pages 121, and thereby be associated with the respective focus durations 138. Transitions may also be generated by another approach.

Next, in box 314, the behavior visualization application 117 then encodes the generated focus durations 138 and transitions 142 into a workflow visualization 124 (FIG. 1). This may comprise, for example, generating visual elements 137 (FIG. 1) as a function of the focus durations 138. The visual elements 137 may comprise, for example, objects, geometric shapes, or other graphical components having a size, color, area, or dimension generated as a function of a length of time embodied in the corresponding focus duration 138. For example, a visual element 137 may comprise a rectangle having a length proportional to the amount of time embodied in the corresponding focus duration 138.

The visual elements 137 may also be grouped into subsections or other components of the workflow visualization 124 as a function of a workflow page 121 associated with the corresponding focus duration 138. For example, visual elements 137 corresponding to focus durations 138 of a like workflow page 121 may appear in the same line or horizontal orientation with respect to the workflow visualization 124. As another example, visual elements 137 corresponding to focus durations 138 indicating a focus away from workflow pages 121 may appear in the same line or orientation with respect to the workflow visualization 124. Visual elements 137 may also be grouped by another approach.

The visual elements 137 may also be rendered in a left-to-right, right-to-left, or other directed sequence indicating a chronological progression of the corresponding focus durations 138. For example, a visual element 137 may be rendered with a left-horizontal value approximate to a right-horizontal value of a visual element 137 having chronologically preceding focus duration 138. The visual elements 137 may also be rendered by another approach.

Spacing between visual elements 137 may also indicate an amount of time between the corresponding focus durations 138. For example, two visual elements 137 on the same line, indicating their corresponding to focus durations 138 of the same workflow page 121, may have a space between them indicating an amount of time between the end of a first focus duration 138 and the beginning of a second focus duration 138.

Generating the workflow visualization 124 may also comprise generating element links 141 (FIG. 1) graphically connecting visual elements 137 whose corresponding focus durations 138 occur consecutively as embodied in the transitions 142. This may comprise encoding element links 141 as lines or arrows connecting segments of visual elements 137, thereby indicating a transition 142 between the respective consecutive focus durations 138. Element links 141 may also be encoded into the workflow visualization 124 by another approach.

Figure 4:
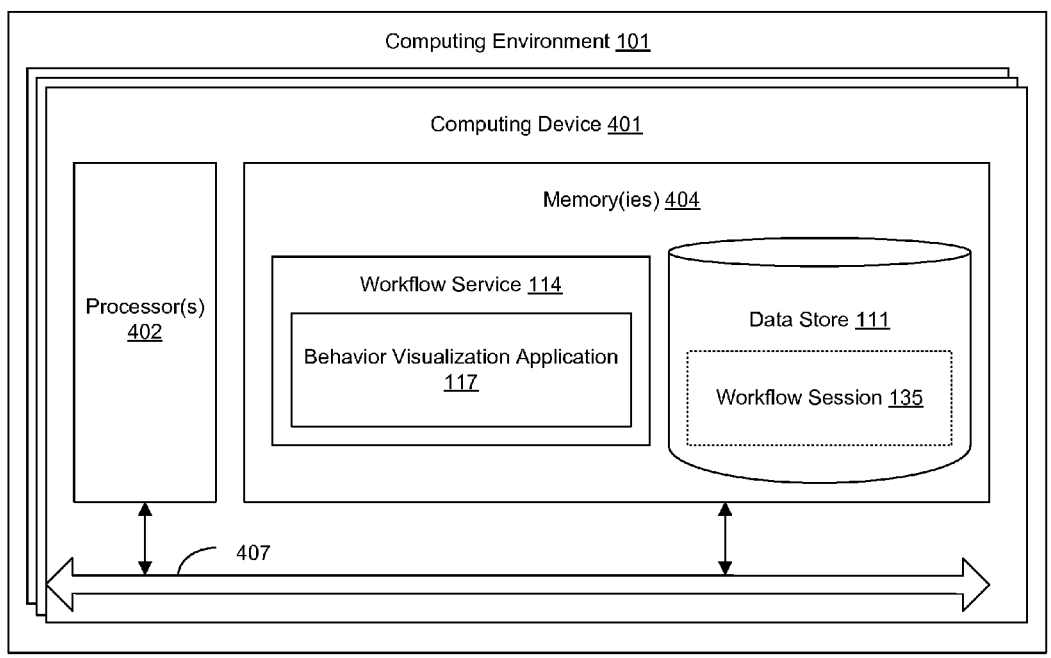
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 101 according to an embodiment of the present disclosure. The computing environment 101 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are a workflow service 114 having a behavior visualization application 117, and potentially other applications. Also stored in the memory 404 may be a data store 111 storing workflow sessions 135 and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although the behavior visualization application 117, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIG. 3 shows the functionality and operation of an implementation of portions of the behavior visualization application 117. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowcharts of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including a behavior visualization application 117 that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:

code that encodes at least one event listener into one of a plurality of network pages to facilitate a detection of a plurality of navigation events, the navigation events comprising at least one of a click event, a focus event, or a defocus event; and code that communicates the one of the network pages to a client;

code that obtains, from the client, the navigation events;

code that generates, based at least in part on the navigation events, a plurality of time durations comprising a consecutive amount of time a user interface focus of the client is directed to an associated one of a plurality of network pages;

code that generates, based at least in part on the navigation events, a plurality of transitions comprising a change in the user interface focus of the client between a respective pair of the network pages; and code that encodes a workflow visualization comprising:

a plurality of visual elements each embodying a respective one of the time durations and having a size based at least in part on the consecutive amount of time of the respective one of the time durations, the visual elements being grouped with respect to the associated one of the network pages; and a plurality of visual links between the visual elements embodying a respective one of the transitions.

2. The non-transitory computer-readable medium of claim 1, wherein the at least one event listener comprises a JavaScript event listener encoded into a template applied to the network pages.

3. The non-transitory computer-readable medium of claim 1, wherein the program further comprises:

code that generates at least one time duration comprising a consecutive amount of time the user interface focus of the client is directed away from the network pages; and wherein the visual elements further embody the at least one time duration.

4. A system, comprising:

at least one computing device; and a behavior visualization application executable in the at least one computing device, the behavior visualization application comprising:

logic that obtains, from a client, a plurality of navigation events with respect to a progression through a plurality of workflow pages by the client;

logic that generates, based at least in part on the navigation events, a workflow visualization comprising:

a plurality of visual elements each embodying a consecutive amount of time a focus of the client is directed to a respective one of the workflow pages and having a size based at least in part on the consecutive amount of time; and a plurality of graphical links between the visual elements each embodying a transition between a respective pair of the workflow pages.

5. The system of claim 4, wherein the navigation events comprise at least one of a click event or a user interface focus change event associated with the workflow pages.

6. The system of claim 4, wherein the behavior visualization application further comprises logic that communicates the workflow pages to the client.

7. The system of claim 6, wherein the behavior visualization application further comprises logic that encodes into the workflow pages a content to facilitate obtaining the navigation events.

8. The system of claim 7, wherein the content comprises a JavaScript event handler.

9. The system of claim 7, wherein the logic that encodes the content into the workflow pages further comprises logic that encodes the content into a template applied to the workflow pages.

10. The system of claim 4, wherein the behavior visualization application further comprises:

logic that obtains, from the client, a screen capture embodying a user interface view rendered during the consecutive amount of time embodied in one of the visual elements; and logic that renders the screen capture responsive to a selection of the one of the visual elements.

11. The system of claim 4, wherein the visual elements are grouped based at least in part on the respective one of the workflow pages.

12. The system of claim 4, wherein the behavior visualization application further comprises:

logic that generates, based at least in part on the navigation events, at least one time duration comprising an amount of time the focus of the client is directed away from the workflow pages; and wherein the visual elements further comprise at least one visual element embodying the at least one time duration.

13. The system of claim 4, wherein the visual links further comprise a visual link embodying a change in the focus of the client away from the workflow pages.

14. A method, comprising:

generating, in a computing device, a plurality of time durations comprising a consecutive amount of time a user interface focus of a client is directed to an associated one of a plurality of workflow pages;

generating, in the computing device, a plurality of transitions each comprising a user interface focus transition performed by the client between a respective pair of the workflow pages; and encoding, by the computing device, a workflow visualization comprising:

a plurality of visual elements each embodying a respective one of the time durations and having a size based at least in part on the respective one of the time durations; and a plurality of visual links between the visual elements embodying a respective one of the transitions.

15. The method of claim 14, further comprising:

obtaining, in the computing device, from the client, a plurality of navigation events comprising at least one of a click event, a focus event, or a defocus event; and wherein the transitions and the time durations are generated as a function of the navigation events.

16. The method of claim 14, further comprising:

encoding, by the computing device, a content into one of the workflow pages to facilitate obtaining of the navigation events; and communicating, in the computing device, the one of the workflow pages to the client.

17. The method of claim 16, wherein the content comprises a JavaScript event handler.

18. The method of claim 14, wherein the visual elements are grouped as a function of an associated one of the workflow pages.

19. The method of claim 14, wherein the workflow visualization is encoded based at least in part on a workflow session.

20. The method of claim 14, further comprising:

generating, in the computing device, at least one time duration a comprising a consecutive amount of time the user interface focus of the client is directed away from the workflow pages; and encoding, in the computing device, the at least one time duration as one of the visual elements.

\* \* \* \* \*